June 22, 1926.

1,589,349

C. L. BAUSCH ET AL

PROJECTION APPARATUS

Filed Nov. 25, 1921    4 Sheets-Sheet 1

INVENTORS
Carl L. Bausch
BY William L. Patterson
their ATTORNEY

June 22, 1926.
C. L. BAUSCH ET AL
1,589,349
PROJECTION APPARATUS
Filed Nov. 25, 1921    4 Sheets-Sheet 2
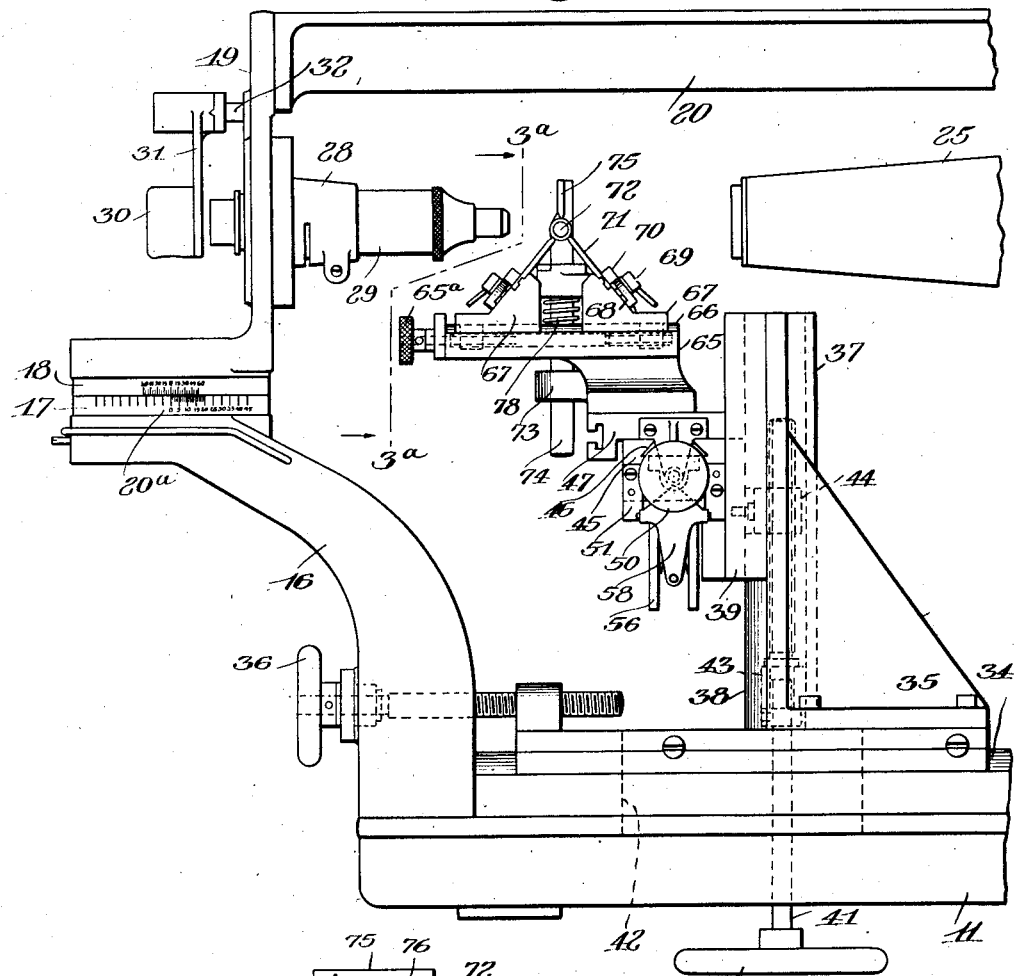
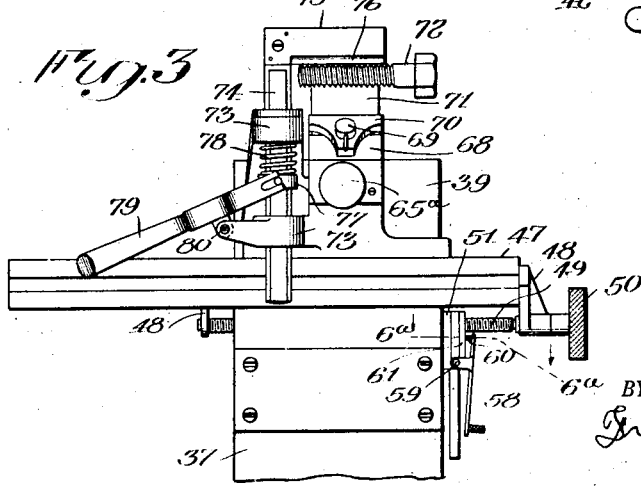
INVENTORS
Carl L. Bausch,
BY William L. Patterson
Frederick G. Church
their ATTORNEY June 22, 1926.

C. L. BAUSCH ET AL

PROJECTION APPARATUS

Filed Nov. 25, 1921   4 Sheets-Sheet 3

1,589,349

INVENTORS
Carl L. Bausch
William I. Patterson
BY
their ATTORNEY

June 22, 1926.
C. L. BAUSCH ET AL
PROJECTION APPARATUS
Filed Nov. 25, 1921    4 Sheets-Sheet 4
1,589,349
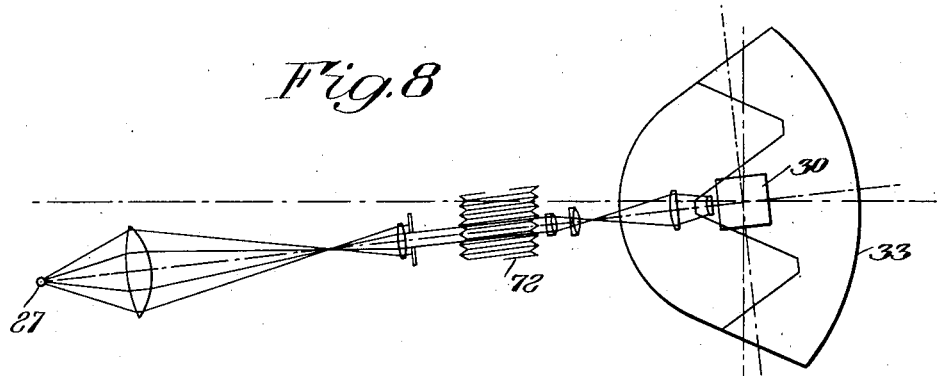
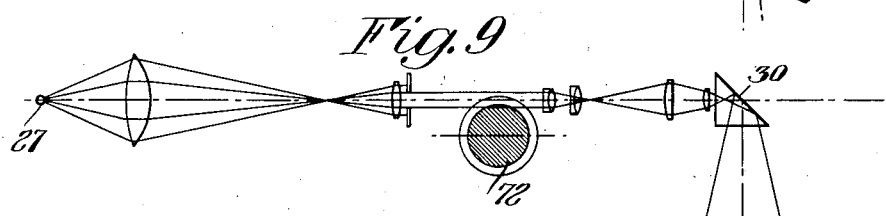
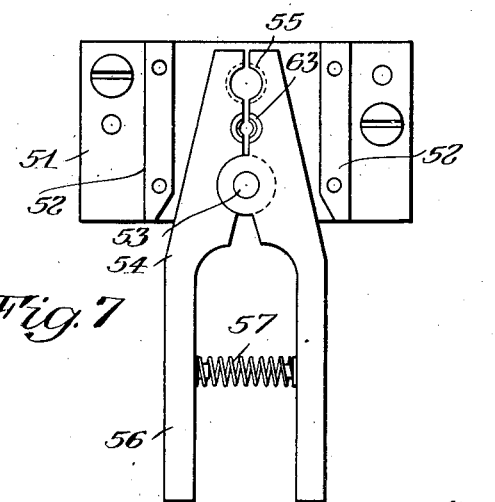
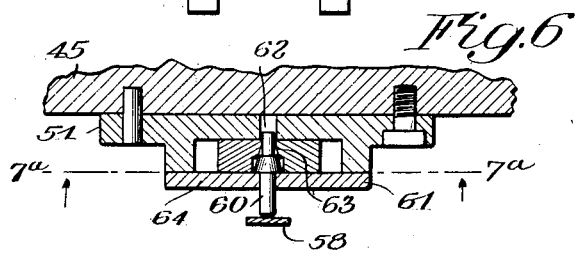
INVENTORS
Carl L. Bausch
William L. Patterson
BY
their ATTORNEY Patented June 22, 1926.

1,589,349

UNITED STATES PATENT OFFICE.

CARL L. BAUSCH AND WILLIAM L. PATTERSON, OF ROCHESTER, NEW YORK, ASSIGNORS TO BAUSCH & LOMB OPTICAL COMPANY, OF ROCHESTER, NEW YORK, A CORPORATION OF NEW YORK.

PROJECTION APPARATUS.

Application filed November 25, 1921. Serial No. 517,509.

This invention relates to projection apparatus and more particularly to apparatus of this character adapted to be employed for visually inspecting and measuring objects such as machine parts, screw threads, gear teeth and the like. One object of the invention is to provide a compact, self contained apparatus of this class comprising light projecting means, object supports, and a screen, conveniently constructed and arranged to provide a variety of adjustments within easy reach of the operator and to facilitate accurate and rapid study of the detailed characteristics of an object.

Another object is the provision of an apparatus of the above character having the parts thereof compactly combined on a unitary and rigid frame, thereby facilitating relative adjustment of the parts, while eliminating relative vibration and inadvertent disarrangement thereof, and thus affording also a device of a readily portable type which may be disposed as conditions of use may require.

Still a further object is the provision of such an apparatus having conveniently accessible and efficient means for making the desired study and measurements of the image of the object. To these and other ends the invention resides in certain improvements and combinations of parts all as will hereinafter be more fully described, the novel features being pointed out in the claims at the end of the specification.

In the drawings:

Figure 2 is an enlarged elevation of the opposite side of a portion of the machine;

Figure 3 is an illustration of parts of the machine as seen from the line 3ª—3ª in Figure 2;

Figure 6 is an enlarged detailed view substantially on the line 6ª—6ª of Figure 3;

Figure 7 is an elevation as seen from the line 7ª—7ª in Figure 6, with parts removed; and Figures 8 and 9 are diagrammatic views illustrating the relations of the optical system, the object to be projected and the screen, in plan and elevation, respectively.

Similar reference numerals throughout the several views indicate the same parts.

In the manufacture of screw threads, small gears and other machine parts, the examination and measurement of the work by the use of calipers, gages, and similar means have been found, in a large proportion of instances, to be of such a superficial and approximate character, owing to the size and form of the objects, that the results have been inadequate and frequently misleading or erroneous. Accordingly, efforts have been made to provide suitable optical means for producing magnified images of the work so that the details of its surfaces and shapes can be visually inspected and accurately measured. These efforts have resulted in projection apparatus which has been heretofore found more or less cumbersome in form and arrangement and not adapted to afford the convenience, speed and accuracy desired in operation. The present invention therefore, provides an apparatus of the character indicated above comprising an optical system, object supporting means and a screen combined in a compact and self contained manner on a unitary frame. These parts are made fully adjustable with a view to accommodate a wide variety of work and promoting complete examination of the same and are so disposed and arranged as to provide for maximum accuracy and clearness in the projected image. The latter is thrown upon a screen accessibly arranged and supplied with instruments facilitating complete and accurate study of the image as will appear from the following detailed description.

Figure 1:
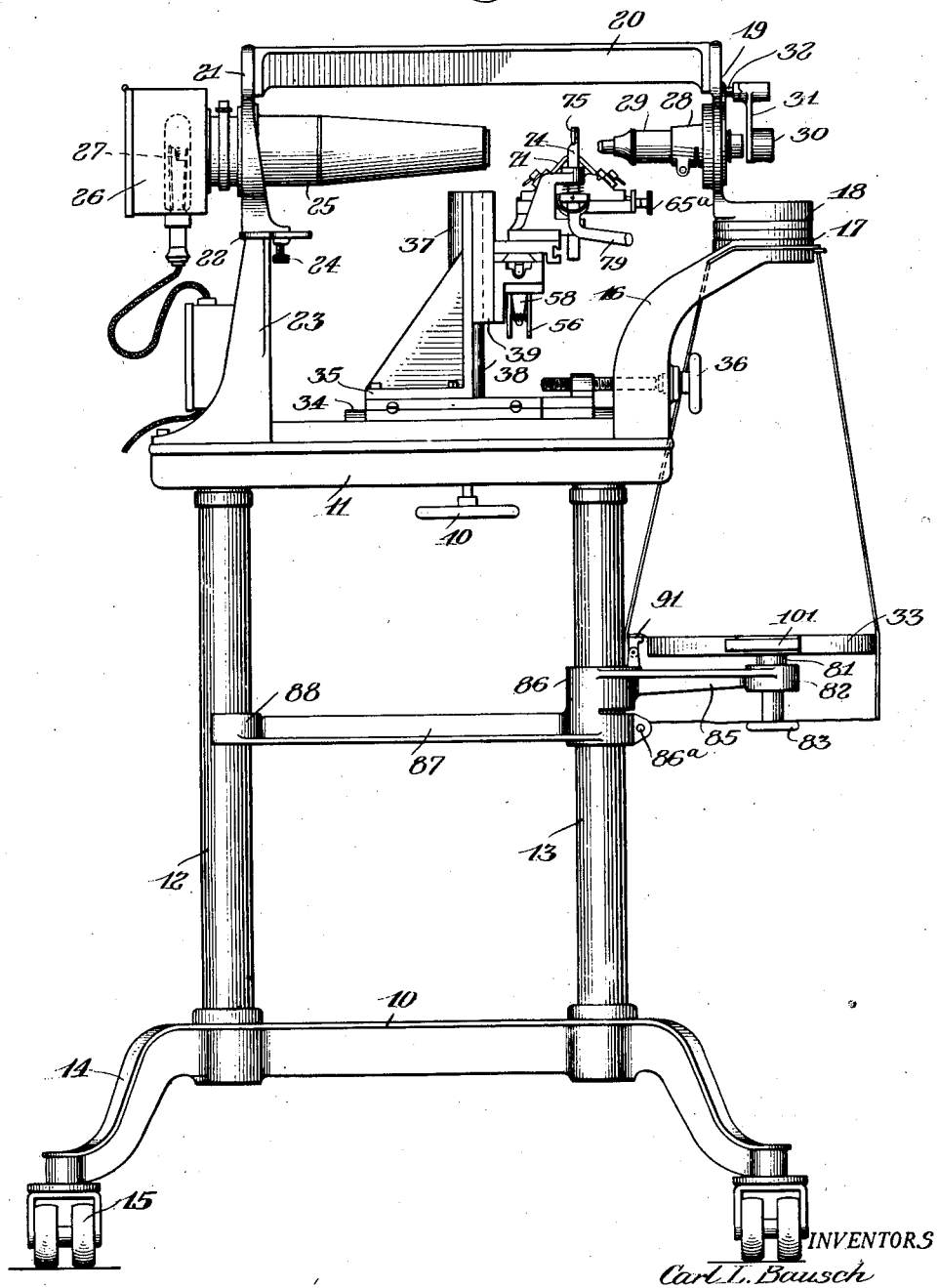
Figure 1 is a side elevation of a machine embodying the present invention.
Figure 4:
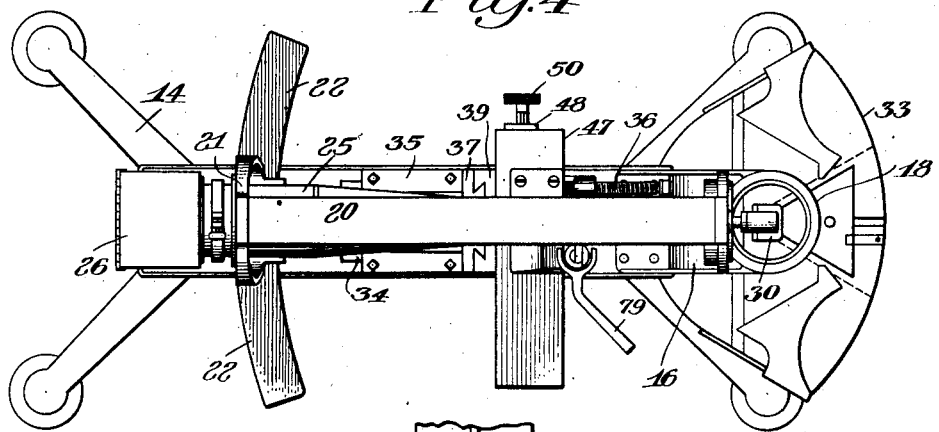
Figure 4 is a top plan view of the machine.
Figure 5:
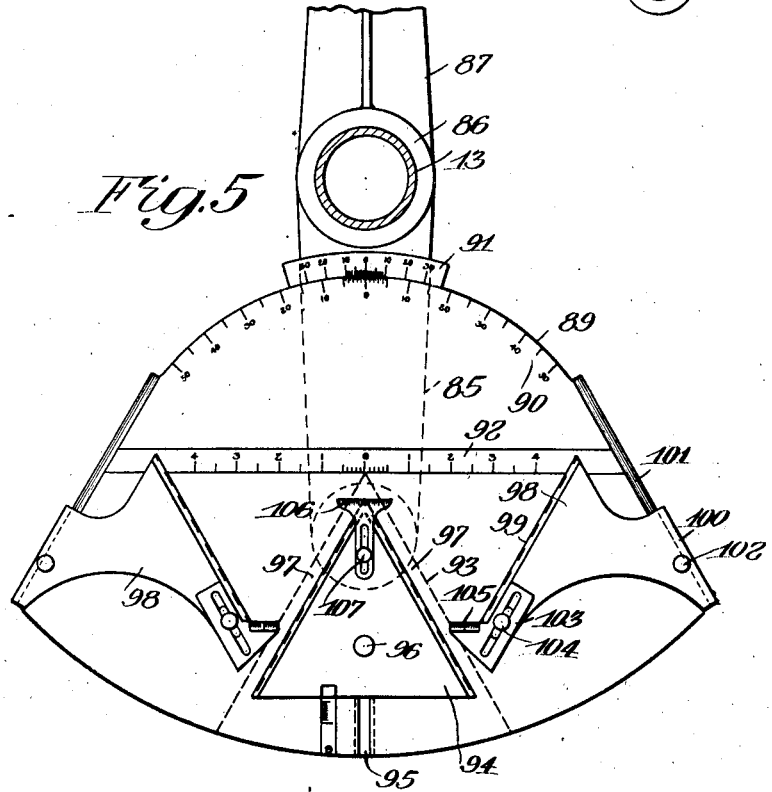
Figure 5 is a top plan view of the screen.

Referring more particularly to the drawings, there is shown in Figure 1 a main frame comprising, preferably, a base portion, or base, 10, and an upper portion, or bed, 11, which portions are rigidly connected by spaced tubular columns, 12 and 13. Base portion 10 is provided at either end with a pair of branching legs 14 each carrying a roller device 15 so that the frame may be readily moved over the floor to desired positions of use.

The optical system and the object supporting means are carried on the bed 11 of the frame. Referring first to the optical system, one end of the bed is shown as provided with an upright 16 formed at its upper end with a substantially horizontal bearing ring 17 on which is rotatably supported, in any suitable manner, a ring 18 carrying an upright 19. Fixed to the upright 19 is a substantially horizontal part, or bar, 20 extending in the same general direction as the frame bed and having fixed to its other end the top of an upright 21. The latter is formed at its lower end with a bearing surface slidably supported on an arc shaped bearing plate 22. It is evident from this construction that bar 20 is supported at one end by the bearing rings 17 and 18 for pivotal movement about a substantially vertical axis and is adjustably supported at its other end so that it may be disposed at various angles relative to the frame bed, any suitable means being provided for clamping bar 20 in adjusted position, such, for example, as the screw 24 shown. At 20ª, Figure 2, is a scale marked in degrees and provided with a vernier indicating the rotary position of the part 20.

The upright 21 supporting one end of bar 20 preferably has formed therein a bearing supporting a horizontally extending tube 25 forming a portion of the optical system. The outer end of the tube carries a lamp house 26 in which is placed a lamp 27 provided with suitable electrical connections. Within tube 25 are arranged condensing means or lenses of the usual or any suitable character for condensing the light from the light source, or lamp 27, and directing the same toward the pivotal axis of the supporting bar 20.

The upright 19 at the other end of bar 20 is preferably formed with a bearing 28 supporting a tube 29 containing projecting and magnifying means or lenses of the usual or any suitable variety. This projecting portion of the optical system is also arranged to direct the light thru the pivotal axis of the supporting bar 20 and in alignment with the condensing means so that the condensing and projecting means are arranged in fixed relation to a common optical axis passing thru the pivotal axis of the support 20 and adjustable about the pivotal axis as a center.

A prism or other deflecting means 30 is placed at the intersection of the optical and pivotal axes of the optical system, being shown as supported by an arm 31 rotatably supported on a stud 32 fixed in upright 19, so that the prism 30 may be swung away from the operating position shown if so desired. The prism directs the light at right angles downwardly, substantially along the pivotal axis of the optical system. The deflected light passes thru the rings 17 and 18 and is reflected by a substantially horizontal screen 33. The latter, as hereinafter described, is preferably in the form of a board or table carried below on the frame columns at an elevation convenient for access and examination of the projected image. It is apparent from this construction that an object placed between the condensing and projecting means is illuminated by the condensing means and its image thrown by the projecting means and the prism 30 downwardly upon the screen 33. The condensing and projecting means are in alignment with each other, as preferred for best results and while the optical system may be swung through an angle about its pivot for purposes described later, the image may at all times be thrown upon the screen 33.

The object to be projected is adjustably supported on bed 11 of the frame between the condensing and projecting means, to which end bed 11 is preferably formed with guideways 34 extending in the same general direction as the optical axis. Movable over these guideways is a slide 35 adjusted by means of a spindle and hand wheel 36, as well understood in the art, handle 36 being conveniently located adjacent the screen so as to be within easy reach of the operator. This adjustment serves to move the object along the bed and toward and from the projecting means for focusing the same. Slide 35 carries a vertical standard 37 formed with guideways 38 over which moves a slide 39. The slide is adjusted vertically by means of a hand wheel 40, Figure 2, located below the frame bed, within reach of the operator, on a threaded spindle 41 extending upwardly through a slot 42 in the bed. The spindle is carried by a nut 43 on standard 37 and cooperates with a nut 44 carried by slide 39 to move the latter. This construction provides for vertical adjustment of the object to bring desired portions thereof into the optical axis.

Slide 39 carries a horizontal shelf 45 formed with guide-ways 46 extending transversely of the bed and optical axis. Movably carried on these guideways is a slide 47 which serves for adjusting the object horizontally across the optical axis. As shown in Figure 3, this slide carries depending bearing brackets 48 in which is rotatably supported a threaded spindle 49 provided with an operating handle 50. Fixed on one end of shelf 45 over which this slide moves is a plate 51, Figures 6 and 7, provided with spaced ribs or cleats 52 and between the latter with a stud 53 on which are pivotally supported a pair of cooperating members 54. The upper ends of these members are formed on their adjacent sides to provide a two-part or split nut indicated at 55 for engagement with spindle 49, so that by rotating the spindle while in engagement with the nut, slide 47 may be adjusted as described. It is desirable at times to disconnect the nut from the spindle for quickly effecting a preliminary extensive movement of the slide, the spindle being used for finally locating the slide precisely in desired position. To this end the pivoted parts 54 of the nut are extended below the pivot as at 56 between which extensions is placed a spring 57 tending to engage the nut parts with the spindle. The parts of the nut may be separated to release the spindle by moving the tails 56 toward each other, but more convenient means is provided for holding the nut out of engagement with the spindle comprising a lever 58 having ears struck backwardly on opposite sides thereof and pivotally supported as at 59 on plate 51, the lower end of the lever being provided with a handle and the upper end arranged for engagement with the outer end of a short spindle 60. The latter is longitudinally slidable in a bearing in a cover plate 61 supported by the cleats 52 and also in a bearing 62 in the plate 51. The parts 54 have their adjacent surfaces formed near the nut with a conical opening 63 with which cooperates a correspondingly shaped cam or wedge surface 64 on spindle 60. It is apparent from this construction that by grasping the handle of lever 58 the nut parts 54 may be forced apart or held in separated position and released at the proper time for engagement with the adjusting spindle 49.

Slide 47 carries a body 65 formed with guideways 66 extending substantially parallel with the bed of the frame. Sliding on these guideways toward and from each other are parts or blocks 67 provided with inwardly and upwardly inclined surfaces 68 having clamping screws 69 and plates 70 for clamping plate-like members 71 on the surfaces. The members 71 extend upwardly and inwardly so that their upper edges are parallel and adjacent each other and adapted for supporting an object to be projected, such, for example, as a screw or bolt 72. Body 65 carries a spindle 65ª by means of which the supporting means 71 may be adjusted to different distances from each other for supporting objects of different shapes and sizes. If desired, the edges of plates 71 which engaged the object may be provided with standard screw threads or otherwise formed for cooperation with an object placed thereon. Body 65 carries bearings 73 in which slides vertically a post 74 having at its upper end a horizontal gage or bar 75 preferably formed at its lower side with a straight edge 76 for engagement with the object to be projected, to hold the latter in place on supporting plates 71, and also to mark or define the top portion or portions of the object as viewed in contour. Post 74 has fixed thereon, between bearings 73, a collar 77, between which and the upper bearing is a spring 78 tending to hold the gage down in contact with the object. Means are provided for conveniently raising the gage to release the object, comprising a lever 79 pivotally supported at 80 on the lower bearing 73 and having a forked end for engagement with the post collar 77 for raising the post.

It is evident from the above construction that the object is supported on the frame bed by fully adjustable means so that it may be moved along the optical axis to focus it transversely of the optical axis in both vertical and horizontal directions for bringing the desired portion of the object to position for projection in contour on the screen. These adjustments are conveniently located within reach of the operator from his position at the screen. The means described in the present instance provide for the convenient support of an object, such as a screw or bolt but it is obvious of course that other means may be provided for supporting objects of different shapes and sizes, if desired, by substituting other parts for one or more of those shown.

The screen is preferably in the form of a board or table 33, arranged horizontally and at a convenient height on the frame for access to inspect and measure the projected image. To this end the part 33, which comprises the reflecting surface and is therefore for convenience termed the screen, is supported from below by a trunnion 81 rotating in a bearing 82 and clamped in adjusted position in the bearing by any suitable means such as a spindle and handle 83. Bearing 82 is carried by an arm 85 extending from a sleeve 86 sliding vertically on the frame column 13. The sleeve preferably carries an arm 87 having a yoke 88 sliding on the opposite column 12 to guide and steady the screen supporting means. This construction provides for vertical adjustment of the screen as may be desired, sleeve 86 being longitudinally split for a portion of its length and provided with a clamping screw 86ª of the usual or any suitable variety for locking the screen in vertically adjusted position.

The screen proper comprises the table 33 the upper surface of which is finished and colored to afford an efficient reflecting surface. A portion 89 of the edge of the screen adjacent the frame is formed on an arc concentric with the rotary axis on which the screen is supported and this arcuate edge is marked with a scale 90 cooperating with a vernier scale 91 carried by sleeve 86, to indicate the position of rotary adjustment of the screen for a purpose which will more fully appear hereafter. The screen is in the present instance provided with markings and equipment particularly useful for studying screw threads and has formed thereon also a linear scale 92 graduated in inches from a zero at its center outwardly in both directions. Marked on the screen also are intersecting lines forming an angle 93 the bisector of which is preferably perpendicular to the linear scale 92 at its center. Angle 93 is in the present instance one of 60 degrees which is a standard angle for screw threads, but of course the angle may have other sizes if desired. Arranged on the screen within the angle 93, with its sides parallel and spaced from the sides of the latter is a second angle of 60 degrees formed by intersecting edges of a plate 94 movably carried on the screen. The latter is formed with a T slot indicated at 95 and the plate has suitable parts engaging the slot to guide it so that its sides remain parallel with those of the including angle 93 as it is moved toward and from coincidence with the latter and the plate may be clamped in adjusted position by means of a screw 96. In the examination of screw threads the parts are adjusted to project an image of one of the threads on the screen so that it is approximately coincident with the described standard angles, the latter being relatively adjusted toward and from each other by adjustment of plate 94 to give to the strip or space 97 included between their sides a width equal to the predetermined limits of permissible variation in the thread of the work. In other words the contour lines of the projected thread are arranged to fall between the sides of the outer and inner angles which latter mark the range of tolerance. The edges of plate 94 forming the sides of the inner angle are preferably marked with the broken lines shown for contrasting the same with the shadow of the projection to increase its visibility.

The screen is also provided on each side of the gage angles described with a movable plate 98 having an edge 99 disposed at an angle to the adjacent sides of the gage angles and corresponding to the adjacent side of an adjoining thread. The edge of the plate is marked with a broken line, as in the case of plate 94, to increase its visibility and the plate is maintained during adjustments at the described angle by a downward edge portion 100 slidably engaging a guideway 101 at the side of the screen. Each plate 98 may be clamped in adjusted position by means of a screw 102 and carries at its end adjacent the standard angles an adjustable wing or plate 103 slotted for engagement with clamping and guiding means on plate 98 including a clamping screw 104, so that the plate 103 may be moved parallel with the edge of plate 98 and clamped in adjusted position.

Each plate 103 is formed with a gage or edge 105 marked with suitable graduations and extending parallel with the linear scale 92 or, in other words, parallel with the flats at the root of the thread for measuring the same. The apex of plate 94 is similarly provided with an adjustable plate 106 for measuring the flat at the apex of a thread, the plate 106 being guided for movement on the plate 94 and clamped in adjusted position by a device including a clamping screw 107. When the image of a screw thread is projected on the screen with one of the threads in coincidence as explained with the standard angles, plates 98 on either side may be moved into coincidence with the adjacent sides of adjoining threads. The gage plates 103 and 106 may then be arranged to coincide with the flats at the root and apex of a thread and with the parts thus arranged the lead of the thread is indicated on the linear scale 92 by the edges of plates 98 on either side of the apex of the gage angle 93.

If the angle of the projected thread is designed to be 60 degrees, it may be checked by comparison with the standard angles. If not, the projection may be brought, by rotary adjustment of the screen and transverse adjustments of the work, to position with a side of one of the work threads coincident with one side of the standard angles. Then by rotating the screen on its axis and noting the angle of rotation the angle of the projected thread may be ascertained. The flats of the thread are measured by means of the gage plates 103 and 106. The measuring means on the screen may of course be preliminarily set to correspond with desired thread dimensions and projected images then studied by comparison with the setting of the measuring means on the screen, or a standard gage object or screw may be first projected on the screen and the measuring means of the latter brought into coincidence with the projections of the gage, after which the work to be measured may be similarly projected on the screen and compared with the projection of the gage. In the latter method of procedure, the height of the contour image, defined by the gage bar 75 may be used, by reference to the scale 92 or some other marking on the screen, to indicate the diameter of an object as compared with that of a gage. With the screen located at a known distance from the projecting means, and with a known magnifying power of the latter, the dimensions of an object may be accurately determined from the dimensions of its image on the screen.

In operation, the object or work supporting means is provided with parts suited to the character of the object, as for example the slide 47 and the plates 71 for supporting a screw or bolt. The light source and condensing means illuminate the work and by means of the various adjustments described the work is moved to bring into the optical axis and into focus the portion thereof which it is desired to project in contour on the screen. The projecting means is provided with lenses of suitable magnifying power and the construction and arrangement of the parts is such as to throw a clear and sharp contour image on the screen. In some cases, as for example in the examination of screw threads, it is desirable to provide for relative angular adjustment between the object or work and the optical system, and this is accomplished in the present machine by swinging the optical system on its pivotal axis. Thus the optical axis is brought into coincidence with the helical angle of the thread for projecting a clear contour image of the same. The arrangement of the light source, condensing and projecting means on a common axis provides for a maximum of illumination and contrast between light and shadow on the screen, and the relative angular adjustment between the object and the optical system facilitates the projection of a contour in sharp and distinct lines. When the optical axis is angularly adjusted as described the screen may be correspondingly rotated through the same angle so that the image may always be projected in the desired relation to the measuring devices of the screen. With the image located as described with reference to these measuring devices the screen may be rotated through an angle to measure the angle of a thread and the various linear dimensions of the thread may be measured or compared with the standard as already described. In addition of course the character of the surfaces and angles of the work may be examined in minute detail for such correction of manufacturing processes as may appear necessary.

The various parts of the machine are fully adjustable relatively to each other and the combination of these parts in the unitary, self-contained structure described brings them conveniently within reach and control of a single operator. The arrangement of the parts on a single rigid frame, moreover, eliminates the vibration of one element relative to another and inadvertent derangement of the same, and provides a portable type of machine. As a result of these advantageous features the apparatus is capable of rapid operation and produces accurate results of great assistance in manufacturing operations.

We claim as our invention:

1. A projection apparatus comprising a frame, an optical system thereon provided with condensing and projecting lenses, object supporting means on the frame, said optical system having a pivotal movement as a unit on said frame for projecting a portion of the object in contour, and a screen arranged to receive the projected image.

2. A projection apparatus comprising a light source, condensing and projecting means, object supporting means, and screen means for receiving a projected image of the object, said condensing and projecting means having a pivotal movement as a unit relative to said supporting means and screen means for projecting a portion of the object in contour on said screen means.

3. A projection apparatus comprising a frame, a light source thereon, condensing means on said frame, projecting means on the frame having a connection with said condensing means for maintaining them in axial coincidence, object supporting means on the frame, said condensing and projecting means having a pivotal movement as a unit on said frame for projecting a portion of the object in contour, and a screen for receiving a projected image of the object.

4. A projection apparatus comprising a frame element, a light source and condensing and projecting means on said element, object supporting means, said element being pivotally supported for movement relative to said supporting means for projecting a portion of the object in contour, and a screen for receiving a projected image of the object.

5. An apparatus for observing and measuring machine parts comprising a frame, a light source thereon provided with condensing means, projecting means on the frame, supporting means for a machine part on the frame, said projecting and condensing means having a pivotal movement together on said frame for projecting a portion of a machine part in contour, and a screen adjustably carried on the frame to receive the projected image.

6. A projection apparatus comprising a frame, a light source thereon provided with condensing means, projecting means on the frame, object supporting means on the frame, said projecting and supporting means having a relative adjusting movement transversely of the axis of the projecting means and also a relative pivotal movement to project a portion of the object in contour, and a screen for receiving a projected image.

7. A projection apparatus comprising a frame, a light source thereon provided with condensing means, projecting means on the frame, object supporting means on the frame, said projecting and supporting means having relative adjusting movements parallel with and transversely of the axis of the projecting apparatus and also a relative pivotal movement, and a screen positioned to receive the projected image.

8. A projection apparatus comprising a frame, a light source thereon provided with condensing means, projecting means on the frame, object supporting means on the frame, said projecting and supporting means having a relative focusing movement and relative positioning movements in a plurality of directions transversely of the axis of the projecting means and also a relative angular movement for projecting a portion of the object in contour, and a screen positioned to receive the projected image.

9. A projection apparatus comprising a frame, a light source thereon provided with condensing means, projecting means on the frame, means for angularly deflecting the path of the projected light, object supporting means on the frame, said projecting and supporting means having a relative focusing movement, a relative positioning movement transversely of the axis of the projecting means and also a relative pivotal movement for projecting a contour image of the object, and a screen on the frame in the path of said deflected light for receiving the image.

10. In a projection apparatus, a frame, a part pivotally supported on said frame, a light source provided with condensing and projecting means carried by said part, object supporting means on the frame comprising a plurality of movable parts for adjusting the object transversely of the path of light and for focusing the same relative to the projecting means, and a screen for receiving the projected image.

11. In a projection apparatus, a unitary frame, a part pivotally supported thereon, a light source provided with condensing and projecting means carried by said part, object supporting means comprising a plurality of slides movable on the frame for focusing different portions of the object, and a screen adjustably carried by said frame for reflecting the projected light.

12. In a projection apparatus, a unitary frame, a part pivotally supported thereon, a light source provided with condensing and projecting means carried by said part, object supporting means comprising a plurality of slides movable on the frame for focusing different portions of the object, a screen on the frame arranged in substantially horizontal position, and prismatic means for directing the projected light on the screen.

13. A projection apparatus comprising a frame, object supporting means thereon, a substantially horizontal arm supported on the frame for pivotal movement about a substantially vertical axis, a light source provided with condensing means on said arm adjacent one end thereof, projecting means on the arm adjacent the other end thereof, means for adjustably supporting an object between said condensing and projecting means, a substantially horizontal screen on said frame, and light deflecting means for throwing projected light on the screen.

14. In a projection apparatus, a frame, an optical system thereon comprising a light source and projecting lenses, means on the frame for supporting an object for projection comprising a slide, a guideway for the slide provided with a nut, a rotary threaded spindle carried by the slide for engagement with the nut to move the slide, and adjustable means for engaging and disengaging the nut and spindle to provide for movement of the slide independent of said spindle.

15. In a projection apparatus, a frame, an optical system thereon comprising a light source and projecting lenses, means on the frame for supporting an object for projection, said projecting lenses and supporting means being relatively adjustable for projecting a portion of an object in contour, a gage provided with an edge for cooperation with the projected contour of the object, and devices supporting said gage for movement toward and from the object.

16. In a projection apparatus, a frame, an optical system thereon comprising a light source and projecting lenses, means on the frame for supporting an object for projection, said projecting lenses and supporting means being relatively adjustable for projecting a portion of an object in contour, a gage supported for movement toward and from the object and having an edge for projection with the contour of the object, and resilient means for holding the gage in cooperation with the object.

17. In a projection apparatus, a frame, an optical system thereon comprising a light source and projecting lenses, means on the frame for supporting an object for projection comprising an element having a guideway extending substantially parallel with the axis of said projecting means, a pair of slides movable toward and from each other on said guideway for supporting engagement with the object, screw means for moving said slides, and devices for effecting relative positioning and focusing movements of said projecting lenses and supporting means and also a relative angular movement of the same for projecting a portion of the object in contour.

18. In a projection apparatus, a frame, a part pivotally supported thereon, a light source on said part, projecting means on said part provided with means for deflecting the projected light substantially parallel with the pivotal axis of said part, adjustable object supporting means on the frame, and a screen supported on the frame in substantially perpendicular relation to said axis for rotary adjustment about the latter as a center.

19. In a projection apparatus, a frame, an arm pivotally carried thereby, a light source provided with condensing means on the outer end of the arm, projecting means on the inner end of the arm provided with means for deflecting the projected light parallel with the pivotal axis of the arm, object supporting means adjustably carried by the frame between said condensing and projecting means for positioning and focusing the object, and a screen provided with measuring means supported on the frame in perpendicular relation to said pivotal axis for rotary adjustment about the latter as a center.

20. In a projection apparatus, a portable unitary frame, an optical system thereon comprising a light source and condensing and projecting lenses located in fixed relation to a common optical axis, object supporting means on said frame, means for effecting pivotal adjustment of the axis of said optical system relative to said supporting means to project a portion of an object in contour and a screen arranged on said frame to receive the projected image.

21. In a projection apparatus, a frame, a light source and a projecting lens system on said frame, a guideway on the frame extending substantially parallel with the axis of said lens system, a pair of slides movable toward and from each other on said guideway, a part on each of said slides for supporting engagement with an object to be projected, a gage for contact with a portion of said object to be projected in contour, and a screen arranged to receive the projected image.

22. In a projection apparatus, a frame, a light source and a projecting lens system, on said frame, a guideway on the frame extending substantially parallel with the axis of said lens system, a pair of slides movable toward and from each other on said guideway, and provided with edge portions extending substantially transversely of said axis for supporting engagement with an object to be projected, a bar having an edge substantially parallel with said slide portions for engagement with a portion of the object to be projected in contour, and a screen arranged to receive the projected image.

23. In a projection apparatus, a frame, an optical system thereon supported for pivotal movement about an axis, object supporting means on said frame means for deflecting the projected light parallel with said axis, and a screen for the projected image rotarily adjustable on said frame and provided with movable parts for measuring said image.

24. The combination with a projection apparatus of a rotarily adjustable screen provided with a linear measuring device and with movable angular devices for measuring linear and angular dimensions of a projected image.

25. In a projection apparatus, a screen adapted for rotary adjustment and provided with scale means for indicating said adjustment, scale means on said screen for measuring linear dimensions of an image projected thereon, and angular devices cooperating with one another and said indicating means and scale means for measuring angular dimensions of said image.

26. A measuring screen for projection apparatus comprising a linear scale, a gage representing a predetermined angle cooperating with said scale, and a linear gage movable over said screen parallel with a side of said angle gage and arranged at a predetermined angle with the latter for cooperation therewith and with said linear scale.

27. A screw thread measuring screen for projection apparatus having a pair of equal thread angles indicated thereon and arranged one within the other with their respective sides in parallel spaced relation to mark limiting variations from standard thread dimensions, and a linear part movable over the screen at one side of said angles in a predetermined angular relation with the sides of the latter.

28. A screw thread measuring screen for projection apparatus having a pair of equal thread angles indicated thereon and arranged one within the other with their respective sides in parallel spaced relation to mark limiting variations from standard thread dimensions, means for moving said indicated angles relatively toward and from coincidence with each other to adjust the range of said variations, and a linear part movable over the screen at one side of said angles in a predetermined angular relation with the sides of the latter.

29. A screw thread measuring screen for a contour projection apparatus having the adjacent sides of a pair of successive standard threads indicated thereon in transverse contour, means for moving said indicated sides toward and from each other to effect coincidence with a projected thread image, and linear parts adjustable on said screen adjacent the apex and root of the threads to indicate the flats of the thread at the latter portions.

30. A screw thread measuring screen for a contour projection apparatus having the adjacent sides of a pair of successive standard threads indicated thereon in transverse contour, means for moving said indicated sides toward and from each other to effect coincidence with a projected thread image, a linear scale arranged to measure the lead of the thread, and linear parts adjustable on said screen adjacent the apex and root of the threads to indicate the flats of the thread at the latter portions thereof.

31. A screw thread measuring screen for contour projection apparatus having a standard screw thread indicated thereon in transverse contour by spaced parallel lines movable relatively toward and from one another to mark limiting variations from standard dimensions, a linear part movable over said screen to indicate the adjacent side of a successive thread, a scale for measuring the thread lead, and auxiliary linear parts movable on the screen adjacent the apex and root of the threads to indicate the flats of the thread at the latter portions thereof.

32. In a projection apparatus, a frame, means on the frame for supporting an object, a screen on the frame, projecting means comprising condensing and projecting devices and means for deflecting the projected light on the screen, an arm on which said projecting devices are mounted, and means for mounting said arm for angular adjustment about the axis of the deflected light.

33. In a projection apparatus, a frame, means on the frame for supporting an object, a screen on the frame, projecting means comprising condensing and projecting devices and means for deflecting the projected light on the screen, an arm on which said projecting devices are mounted, means for mounting said arm for angular adjustment about the axis of the deflected light, and means for indicating the extent of such angular adjustment.

34. A projection apparatus comprising a light source, condensing and projecting means, supporting means comprising elongated edge portions extending substantially transversely of the optical axis and adjustable toward and from each other in a direction substantially parallel to said axis for supporting an object to be projected, said condensing and projecting means having a pivotal movement relative to said supporting means for projecting a portion of the object in contour, and screen means for receiving the projected image.

35. A projection apparatus comprising a frame, an optical system thereon provided with condensing and projecting lenses, supporting means on said frame comprising elongated toothed edge portions extending substantially transversely of the optical axis and adjustable toward and from each other in a direction substantially parallel to said axis for supporting an object for the projection of a portion of the contour thereof, and screen means on said frame for receiving a projected image of the object.

36. A projection apparatus comprising a frame, an optical system thereon provided with condensing and projecting lenses, supporting means on said frame comprising elongated toothed edge portions extending substantially transversely of the optical axis and adjustable on said frame toward and from each other in a direction substantially parallel to said axis, said optical system having a pivotal movement on said frame for projecting a contour of a portion of an object carried on said edge portions, and a screen arranged for receiving the projected image.

CARL L. BAUSCH.
WILLIAM L. PATTERSON.